T. G. CRAIGHEAD.
SPHERICAL BLACKBOARD.
APPLICATION FILED JUNE 20, 1916.
1,207,868.
Patented Dec. 12, 1916.
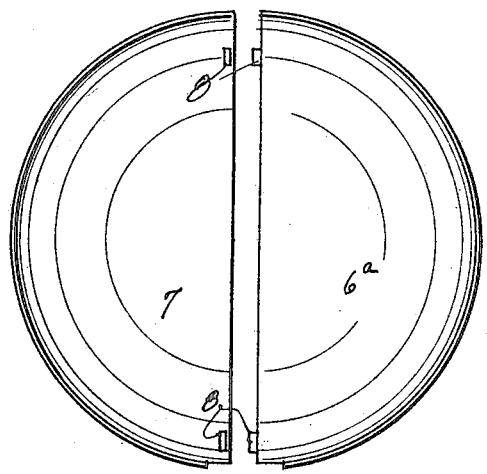
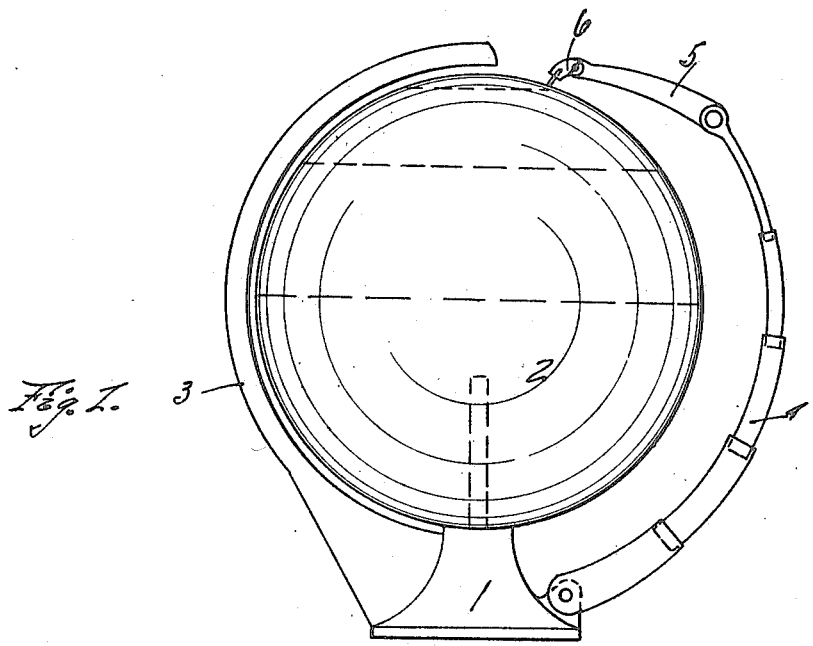

UNITED STATES PATENT OFFICE.

THOMAS G. CRAIGHEAD, OF SEATTLE, WASHINGTON.

SPHERICAL BLACKBOARD.

1,207,868.   Specification of Letters Patent.   Patented Dec. 12, 1916.

Application filed June 20, 1916. Serial No. 104,731.

*To all whom it may concern:*

Be it known that I, THOMAS G. CRAIGHEAD, a citizen of the United States, and a resident of Seattle, in the county of King and State of Washington, have invented certain new and useful Improvements in Spherical Blackboards, of which the following is a full, true, and exact specification.

My invention relates to spherical blackboards and has for its principal object; to provide an improved and novel form of spherical blackboard device which may be used as a globe in drawing maps and the like; to provide improved means for drawing longitude and latitude lines; to provide a removable exterior blackboard shell for the globe so that the work of the student may be removed and preserved.

In class room work it is advantageous to have a spherical blackboard globe for use in accurately drawing maps of the world, hemispheres and continents and their relationship to each other and longitude and latitude lines.

Other objects will appear as my invention is more fully explained in the following specification, illustrated in the accompanying drawings and pointed out in the appended claims.

In the drawings, Figure 1 is an elevation of my device. Fig. 2 is a central sectional view of a removable outer sheet.

Referring more particularly to the drawings, numeral 1 indicates a standard upon which a sphere is removably mounted. Attached to base 1 is a stationary arm 3 which is curved up and around the face of the globe and which is used as a guide in chalking longitude lines. A telescopic and jointed arm 4 is hinged to the base 1 and extends normally around the face of the globe as shown. At the upper end of arm 4 a finger 5 is hinged and is provided with a hinged chalk holder 6 at its outer end. Arm 4 may be telescoped or extended to allow the chalk to make latitude and zone lines around the globe. In making these marks the globe is revolved. Hemispherical shells 6ª and 7 are provided and are adapted to fit snugly over globe 2 and are fastened in place by straps 8. The outer surface of shells, 6 and 7, is adapted to be marked upon and easily erased. The shells are placed upon the globe and when the map is drawn upon them they may be removed and preserved.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

1. In a device of the class described, the combination of a revolving blackboard globe mounted upon a standard, a telescopic arm hinged to said standard and extending upward adjacent the surface of the globe, and means upon the free end of the arm for marking the globe.

2. In a device of the class described, the combination of a revolving globe mounted upon a standard, a telescopic arm hinged to said standard and extending upward adjacent the surface of the globe, and means upon the free end of the arm for marking the globe, hemispherical hollow blackboards adapted to be removably attached around the said globe, whereby a map may be drawn upon the said hemispheres removed.

3. In a device of the class described, the combination of a globe revolubly mounted on a standard, hemispherical hollow blackboard shells removably attachable to said globe, and means for adjustably holding a crayon in contact with the surface of said hemispheres.

THOMAS G. CRAIGHEAD.